United States Patent
Quinn et al.

(10) Patent No.: US 6,246,953 B1
(45) Date of Patent: Jun. 12, 2001

(54) INTERNAL COMBUSTION ENGINE KNOCK DETECTION

(75) Inventors: Richard William Quinn, Hertfordshire; Ian Halleron, Essex, both of (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/419,394

(22) Filed: Oct. 15, 1999

(30) Foreign Application Priority Data

Oct. 26, 1998 (GB) .................................................. 9823239

(51) Int. Cl.$^7$ ................................ F02P 5/152; G06G 7/70
(52) U.S. Cl. ...................... 701/111; 701/115; 123/406.34
(58) Field of Search ................... 73/35.03, 35.04, 73/35.09, 116, 35.06; 701/102, 103, 111, 115; 123/406.34, 406.36

(56) References Cited

U.S. PATENT DOCUMENTS

| | | | | |
|---|---|---|---|---|
| 4,422,421 | * | 12/1983 | Ezoe ................................. | 123/406.34 |
| 5,386,367 | * | 1/1995 | Ziegler et al. ....................... | 701/111 |
| 5,485,380 | | 1/1996 | Takasuka et al. . | |
| 5,608,633 | * | 3/1997 | Okada et al. ........................ | 701/111 |
| 5,758,312 | * | 5/1998 | Park ..................................... | 701/111 |
| 5,811,667 | * | 9/1998 | Yamada et al. ...................... | 701/111 |

* cited by examiner

Primary Examiner—Willis R. Wolfe
(74) Attorney, Agent, or Firm—Mark L. Mollon

(57) ABSTRACT

An apparatus and method are provided for detecting knock in a spark ignition internal combustion engine. The engine comprises at least one cylinder with a spark plug, engine condition sensors for sensing engine speed, engine angle and engine noise, and an engine management system (EMS) that receives signals from the sensors to determine engine angle and engine noise. The EMS has a nonvolatile memory, a spark plug driver, and a processor. The processor is arranged to control the spark driver to generate an ignition spark at a desired spark angle according to signals from at least some of the sensors, and determine over a first range of engine angles a background engine noise, and over a second range of engine angles an engine knock noise. The processor then retards (or advances) the spark angle if the level of knock noise relative to background noise exceeds (or falls below) a predetermined level. The first range of angles is selected by the processor according to one or more signals including the engine speed signal, from a plurality of engine angle ranges stored in the nonvolatile memory.

7 Claims, 5 Drawing Sheets

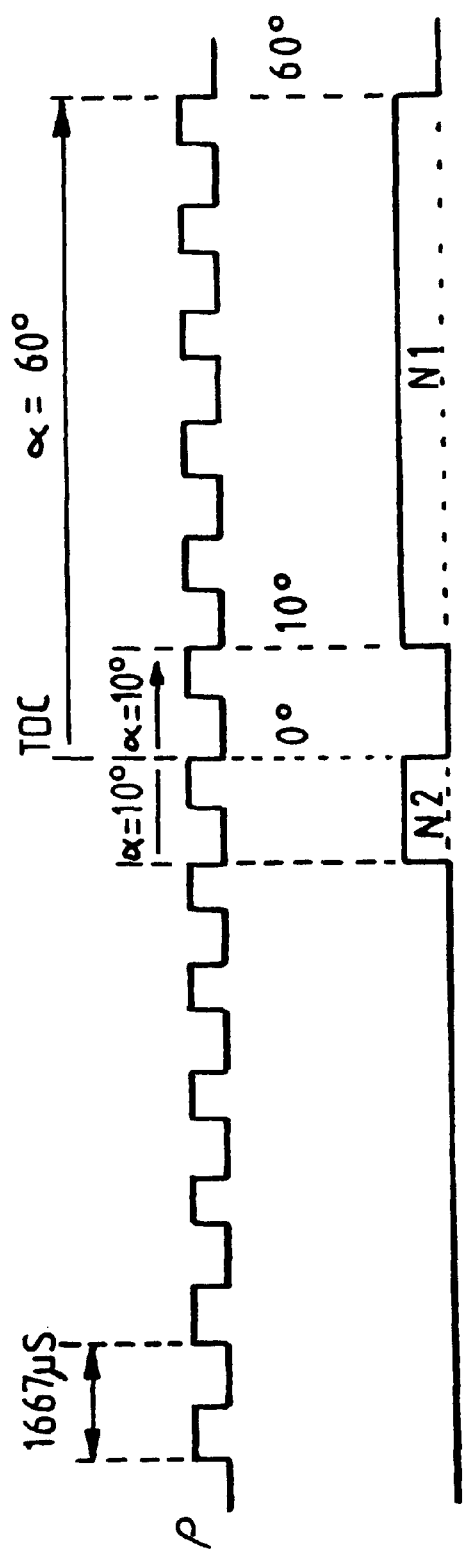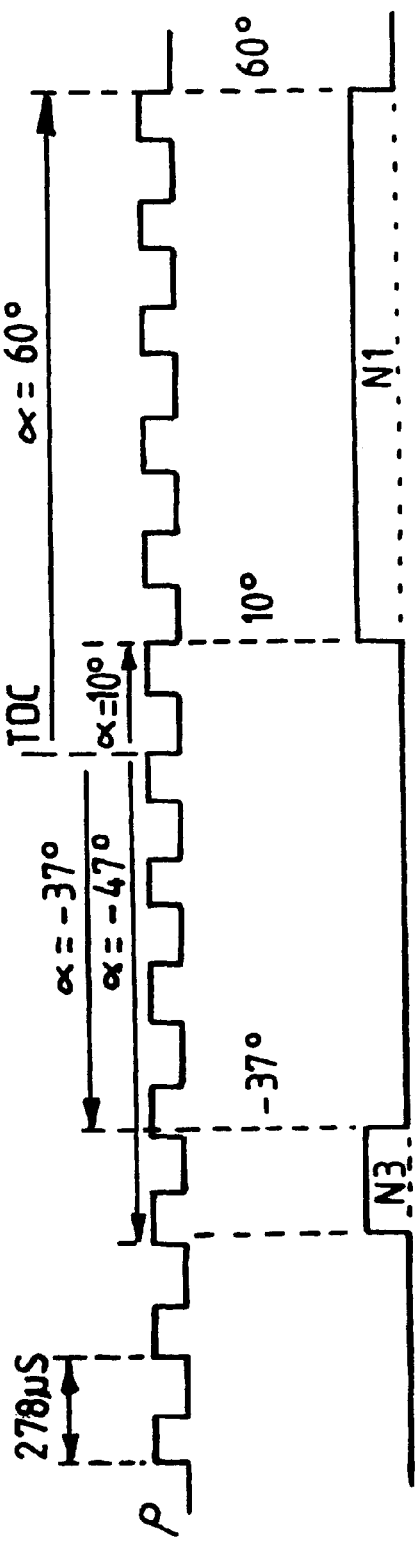

INTERNAL COMBUSTION ENGINE KNOCK DETECTION

TECHNICAL FIELD

The present invention relates to an apparatus and a method for detecting knock in a spark ignition internal combustion engine, particularly in an engine for a motor vehicle.

BACKGROUND ART

Engine knocking, or pre-detonation, can occur in spark ignition gasoline internal combustion engines. Knocking is caused by an undesirably rapid combustion in the combustion chamber, which results in shock waves. These shock waves can be heard by a vehicle driver and can, if persistent, lead to engine damage. There is a strong relationship between the ignition or spark angle and the occurrence of engine knocking.

It is generally desirable to operate an internal combustion engine with an advanced spark angle, that is, with an ignition spark that is advanced in time of a top dead center position for a cylinder, as this improves engine performance and fuel economy. If the spark angle becomes too far advanced, then engine knocking will occur. Various knock detection systems have therefore been proposed to allow an engine to be operated with a spark angle close to the point at which knocking will occur, while at the same time suppressing persistent knocking.

In one prior art system, disclosed in U.S. Pat. No. 5,485,380, a signal from a piezoelectric knock sensor is used to determine an average engine noise level over a range of engine angles when no combustion is taking place, and then to compare this with output from the same sensor when knocking may take place. If the output when combustion is taking place exceeds a certain level, then knocking is deemed to have taken place.

An advantage of measuring engine knocking noise and background engine noise in different engine angle ranges is that the ratio or comparison of the sensor signals is self-compensating with respect to the general level of engine noise or changes in sensor output due to ageing of the sensor.

It has been found, however, with lower capacity (e.g. 1.0 to 2.0 liter) engines, that it is more difficult to detect knocking than with larger capacity engines having more cylinders. The problem is particularly acute with engines that are fuel efficient and inherently noisier, for example, those having a relatively high compression ratio, lightweight pistons, and a faster fuel burn rate.

DISCLOSURE OF INVENTION

It is an object of the present invention to provide an apparatus and a method for detecting knock in an internal combustion engine that addresses some of these problems.

Accordingly, the invention provides a spark ignition internal combustion engine, having at least one cylinder with a spark plug, means for sensing engine condition including means for sensing engine speed, means for sensing engine angle and means for sensing engine noise, an engine management system arranged to receive input signals from the means for sensing engine condition and to determine therefrom engine angle and engine noise, the engine management system comprising a nonvolatile memory, a spark plug driver for generating an ignition spark, and a processor arranged to:

a) control the spark driver to generate the ignition spark at a desired spark angle according to at least some of the input signals;

b) determine over a first range of engine angles a background engine noise, and determine over a second range of engine angles an engine knock noise;

c) retard the spark angle if the level of knock noise relative to background noise exceeds a first level, and advance the spark angle if the level of knock noise to background noise falls below a second level;

characterized in that the first range of angles is selected by the processor from a plurality of engine angle ranges stored in the nonvolatile memory according to one or more input signals including a signal from the means for sensing engine speed.

The means for sensing engine speed or engine angle may include a variable reluctance sensor or a Hall effect sensor in proximity with a toothed wheel on a crankshaft or camshaft. The means for sensing engine noise may include one or more vibration sensors mounted on an engine block or cylinder head of the engine.

The processor may also calculate from input signals the engine load, so that the first range of angles is selected by the processor also according to the engine load.

The engine background noise when combustion is not taking place can then be selected by the processor according to data stored in the nonvolatile memory. Such data can be generated by first measuring the background engine noise over various first ranges for various engine operating conditions including different engine speeds. For some types of engine, it has been found that this will show a marked variation within certain first ranges of engine angle, varying with time in one engine, or from engine to engine, with respect to engine speed and engine load. There may also be marked variation with engine aging. In some cases, the variability in background noise within a particular first range may be small for any one engine, but there may be a significant variation among a set of similar engines, for example, owing to normal variability of engines due to manufacturing and process tolerances.

It is usually possible to identify a particular first range for each of the various engine operating conditions at which the variance in engine background noise for the engine is reduced. Once these first ranges have been identified, data representative of the particular first ranges in which engine background noise is most consistent can be stored in the nonvolatile memory along with data representative of the corresponding engine operating conditions, for example engine speed and load.

It may also be possible to store other type of data, for example engine coolant temperature, air temperature or humidity, exhaust gas temperature or engine age in terms of running hours. The choice will depend on which variables are found to be the most important in causing engine background noise to vary within one engine, or over a batch of engines.

The engine management system may compare measured background and knock noise levels in various ways. In the simplest implementation, which may be least costly to manufacture, the first level is the same as the second level. Similarly, the first and second levels are predetermined, rather than calculated within the engine management system.

In a preferred embodiment of the invention, the background and knock noise measurements are averages of filtered signals from the engine knock sensor. Such averages are relatively easy to generate in hardware, and can be reduced to a pair of digitized values. Once these numbers have been generated, it is relatively straightforward for the processor to determine if knocking is taking place. Similarly, the processor can readily control the windows or ranges within which the knock and background measurements are made. The invention, therefore, lends itself to a relatively inexpensive implementation, for example in software in a processor that a vehicle may already possess as part of an engine control unit.

Also according to the invention, there is provided a method of running a spark ignition internal combustion engine, the engine comprising at least one cylinder with a spark plug, means for sensing engine condition including means for sensing engine speed, engine angle and engine noise, an engine management system arranged to receive input signals from the engine condition sensors and to determine therefrom engine angle and engine noise, the engine management system comprising a nonvolatile memory, a spark plug driver for generating an ignition spark, the method comprising the steps of:

i) controlling the spark driver to generate the ignition spark at a desired spark angle according to at least some of the input signals;

ii) determining over a first range of engine angles a background engine noise, and determining over a second range of engine angles an engine knock noise;

iii) retarding the spark angle if the level of knock noise relative to background noise exceeds a first level, and advancing the spark angle if the level of knock noise to background noise falls below a second level;

wherein step ii) involves the step of:

iv) selecting the first range of angles from a plurality of engine angle ranges stored in the nonvolatile memory according to one or more input signals including a signal from the means for sensing engine speed.

BRIEF DESCRIPTION OF DRAWINGS

The invention will now be described in further detail, by way of example, with reference to the accompanying drawings, in which:

FIG. 5 is a diagram of digitized engine speed pulses P about an engine top dead center position, and a knock noise window N1 and a selected background noise window N2 at 2000 rpm and 60% engine load;

FIG. 6 is a diagram of digitized engine speed pulses P about an engine top dead center position, and a knock noise window N1 and a selected background noise window N3 at 4000 rpm and 100% engine load.

BEST MODE FOR CARRYING OUT THE INVENTION

Figure 1:
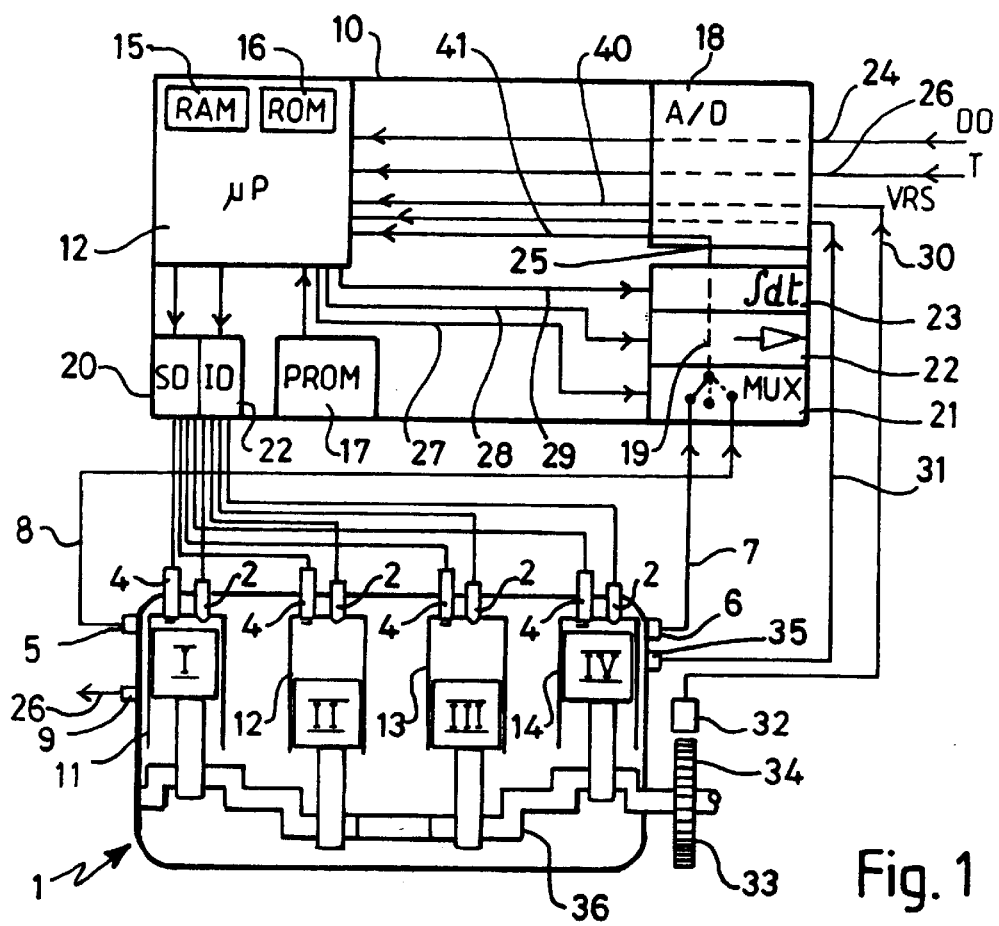
FIG. 1 is a schematic drawing of a four-cylinder, four-stroke, internal combustion engine according to the invention, with an engine management system that receives input signals from an engine speed sensor and at least one engine noise sensor.

FIG. 1 shows schematically a four-cylinder, four-stroke internal combustion gasoline powered engine 1, having a number of cylinders 11,12,13,14, each with a spark plug, and a fuel injector 4, which may be a direct or an indirect injector. The invention is, however, equally applicable to engines having a lesser or greater number of cylinders.

The opening sequences and timings of each injector 2 and spark plug 4 are controlled by an electronic engine management system 10, which determines the amount of fuel and timing of fuel and spark events depending on engine operating conditions.

This engine control system 10 receives several input signals, performs operations and generates output control signals, particularly for the fuel injectors 2 and spark plugs 4. The electronic engine management system 10 conventionally comprises a microprocessor ($\mu$P) 12, a random access memory (RAM) 15, and nonvolatile memories such as a read-only memory (ROM) 16, a programmable read-only memory (PROM) 17, as well as an analog-to-digital converter (A/D) 18 and various input and output interfaces. The system also comprises a spark plug driver 20 and an injector driver 22, both being controlled by the microprocessor 12.

At least one noise sensor is mounted to the engine 1 to provide at least one corresponding noise signal to the engine management system 10. As shown, a noise sensor 5 and 6 are mounted at different ends of the engine to generate noise signals 8 and 7, respectively. For a four-cylinder engine, one noise sensor may be sufficient if this is mounted centrally. For engine having a larger number of cylinders, it is preferred that more than one noise sensor is provided.

The engine management system has a demultiplexer (MUX) 21 that receives a control signal 27 from the microprocessor 12, to select and gate a noise signal 19 during an appropriate time window, as will be explained in more detail below. The selected and gated noise signal 19 is passed first to a variable gain and frequency filtering stage 22, and then to an integrating stage 23. Optionally, these stages 22,23 may receive control inputs 28,29 from the microprocessor, for example to control the level of the gain or the time constant or rate of integration.

The integration stage produces as an analog output a signal 25 representative of the average filtered noise level within a gating window set by the microprocessor 12. The integrated output 25 is then passed to the A/D converter 18, prior to being passed in digital form on a signal line 41 to the microprocessor 12.

Other input signals comprise a driver demand signal (DD) 24, an engine temperature signal (T) 26 from an engine temperature sensor 9, and a signal 30 from a variable reluctance sensor (VRS) 32 all of which are digitized by the A/D converter 18 prior to being passed to the microprocessor 12.

Figure 2:
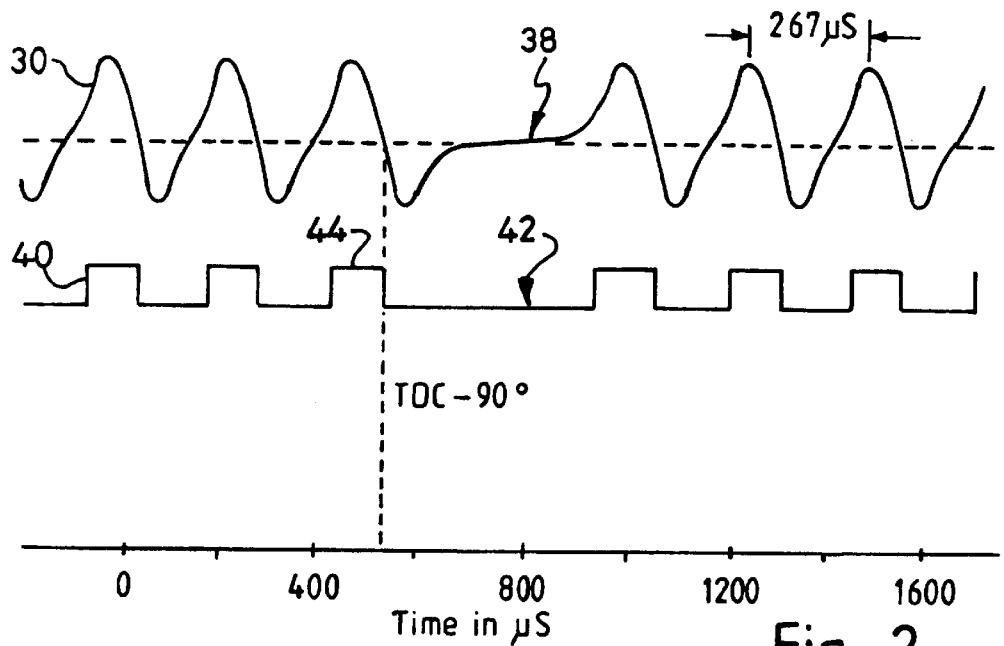
FIG. 2 are plots of the signal from the engine speed sensor, before and after digitization by the engine management system.
Figure 3A:
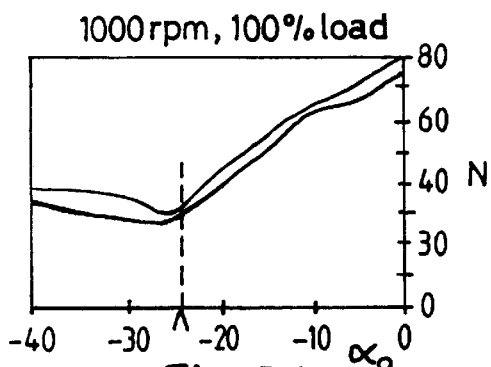
FIGS. 3A to 3H are plots of engine noise N against engine angle $a_0$ at 100% engine load, for a range of engine speeds between 1000 rpm and 6000 rpm.
Figure 3B:
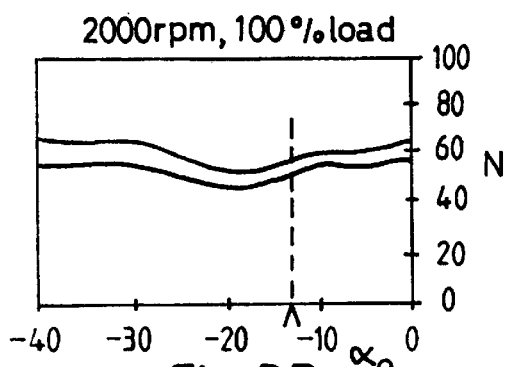

With reference now also to FIG. 2, which shows the VRS signal 30 for an engine running at 6250 rpm, the variable reluctance sensor 32 senses the passage of teeth 33 spaced circumferentially around the periphery of a flywheel 34 on an engine crankshaft 36. The flywheel 34 has a conventional arrangement of teeth referred to herein as 36-1 teeth, wherein thirty-five identical teeth 33 are equally spaced by thirty-four gaps between teeth, and with a one pair of teeth being spaced by a larger gap three times as large as the other gaps. The larger gap corresponds to one missing tooth. The VRS signal 30, therefore, comprises a series of pulses for each revolution of the crankshaft, with one missing pulse, generally indicated at 38 in FIG. 2. Digitization of the raw VRS signal 30 by the A/D converter 18 yields a digitized VRS signal 40, comprising a series of essentially square waves, with one missing pulse 42 corresponding to the missing pulse 38 in the raw VRS signal 30.

The existence of the missing tooth allows the identification of a top dead center (TDC) position for the engine 1. For example, the falling edge of the last digitized pulse 44 before the missing pulse 42 may be at 90° before TDC. Conventionally, for a four-cylinder, four-stroke engine having four corresponding pistons I,II,III,IV, the TDC position for the engine is also the TDC position of pistons I and IV, during one cycle of the engine, and TDC position of pistons II and III during the next cycle of the engine. FIG. 1 shows pistons I and IV at the top dead center position.

It should be noted that in the example shown of an in-line, four-cylinder, four-stroke engine, exhibiting a firing order according to the sequence 1-3-4-2, pistons I and IV (or II and III) pass simultaneously to the TDC position, but with different phases, one then being in the intake (or compression) phase, and the other being in the power (or exhaust) phase. Each piston passes through two cycles, each consisting of 360° of angle, during the four phases or strokes of the cylinder during the intake/compression and power/exhaust phases. The flywheel 34 turns through an angle of 720° during the two cycles, and the variable reluctance sensor 32 produces two pulses indicating a TDC position of the engine 1. It is, therefore, not possible from the VRS signal 30 alone to determine which of the two cycles a cylinder is in, even though the VRS signal gives a good measure of engine angle after one revolution of the flywheel 34.

Other means may, therefore, be provided to determine unambiguously the engine cycle, for example, an engine camshaft sensor 35 that measures the rotational position of a cam shaft (not shown) and that produces a signal 31 that is received by the microprocessor 12 via the A/D converter 18. Once the engine angle and cycle are known, spark events and fuel injection events can be scheduled by the microprocessor 12 to occur at the right engine angles.

In general, it is preferred to advance the spark events so that these occur before top dead center (TDC) positions, for example between about 5° and 25° before TDC, in order to improve fuel consumption and emissions performance. If the engine angle becomes too far advanced, then engine knocking will occur, which can then be detected by one or more of the engine noise sensors 5,6.

The FIGS. 3A–H and 4A–H show two sets of data of measured average levels of engine background noise N, i.e., noise when no knocking event can take place, against an offset engine angle $\alpha_0$. The data was produced from readings of engine noise taken with one noise sensor centrally located between four in-line cylinders of a 1.6 liter indirect injection gasoline engine. Background noise readings were taken within a measurement window extending across 10° of engine angle. The angle at which the background noise measurement was completed is the offset engine angle, so that average background noise values at $\alpha_0=0$ were taken over 10° of engine angle up to the TDC position. Negative values of $\alpha_0$ indicate noise measurement completed in advance of the TDC position.

FIGS. 3A–H and 4A–H show plots with two curves—an upper curve and a lower curve. The curves represent the measured variability in the engine background noise levels over a range of $\alpha_0$ values extending from 0° to −40° of engine angle. The variability for the plotted data is from one particular engine. If the data combined measurements from different engines, then spread of the upper and lower curves would in general be greater.

As expected, the levels of average background noise generally increase as the engine speed increases from 1000 rpm to 6000 rpm, and as engine loading increases from 60% to 100%. The 100% values were generated from an engine running at wide-open throttle and with engine speed limited by appropriate power take off on a dynamometer.

Surprisingly though, the data also show that the shape of the upper and lower curves varies widely, and according to no simple pattern as the engine speed or engine loading increases. The separation between the curves also varies significantly. As a result, the point at which the upper and lower curves come closest, representing the points at which the variability in engine background noises is least, also varies widely and according to no simple pattern. The points in FIGS. 3A–H and 4A–H at which the upper and lower curves come closest, are marked with vertical dashed lines. It is, therefore, possible during manufacture to test an individual engine, or a set of similar engines, in order to identify engine background noise ranges in which variability is minimized, and to store data representative of such ranges in a nonvolatile memory in an engine management system, so that the engine management system can take advantage of the reduced variability in measured background noise to improve the accuracy of knock detection.

Figure 4A:
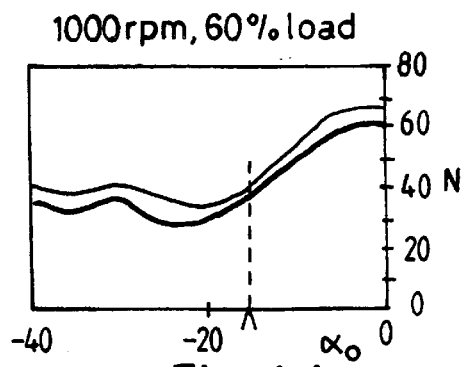
FIGS. 4A to 4H are plots of engine noise N against engine angle $a_0$ at 60% engine load, for a range of engine speeds between 1000 rpm and 6000 rpm.
Figure 4B:
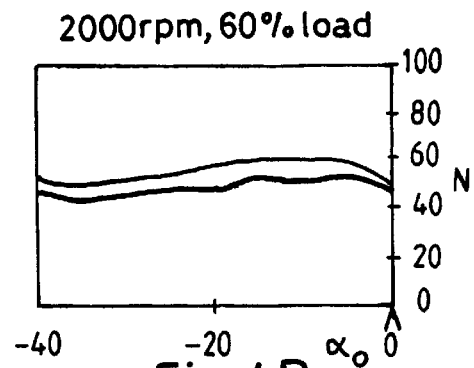
Figure 3C:
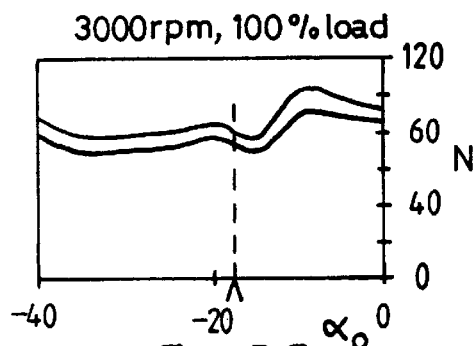
Figure 4C:
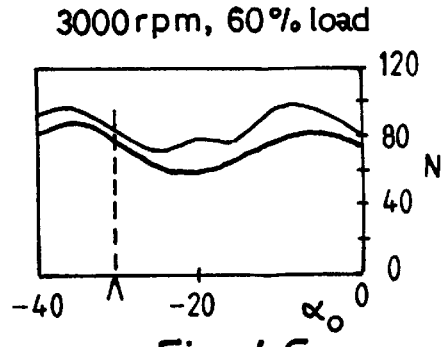
Figure 3D:
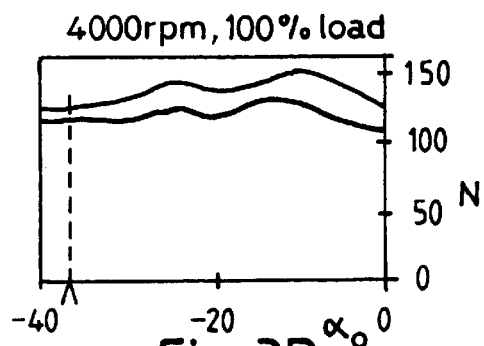
Figure 4D:
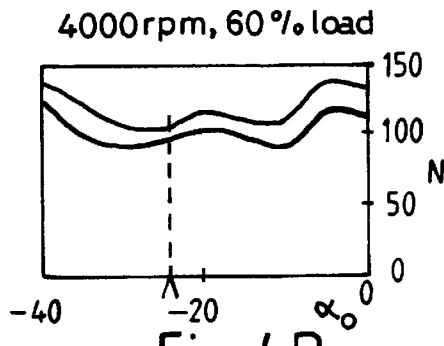
Figure 3E:
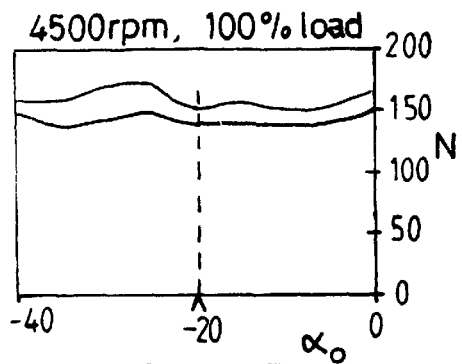
Figure 4E:
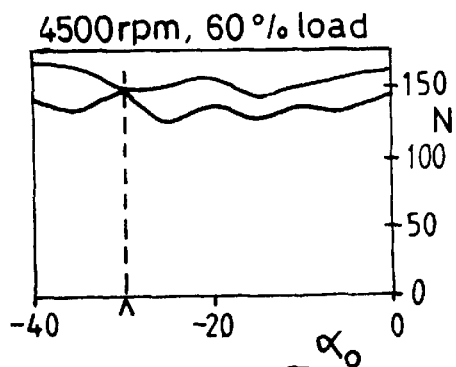
Figure 3F:
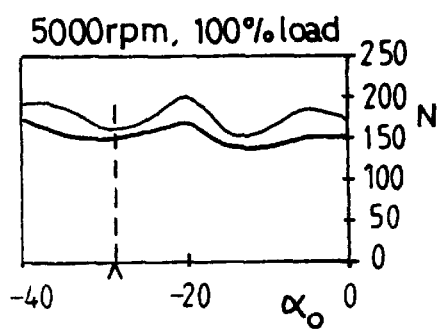
Figure 4F:
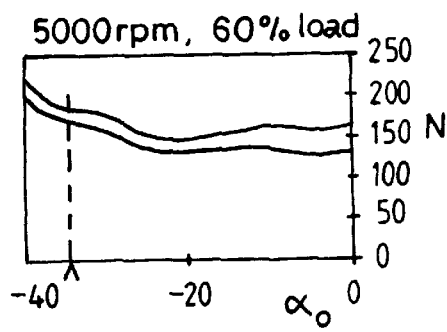
Figure 3G:
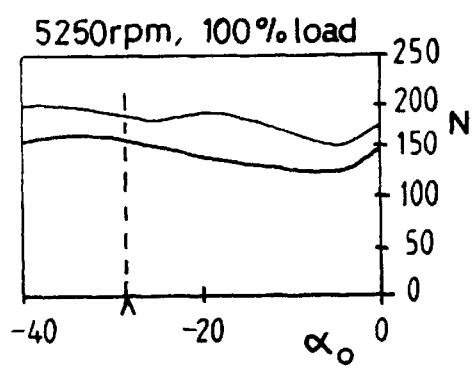
Figure 4G:
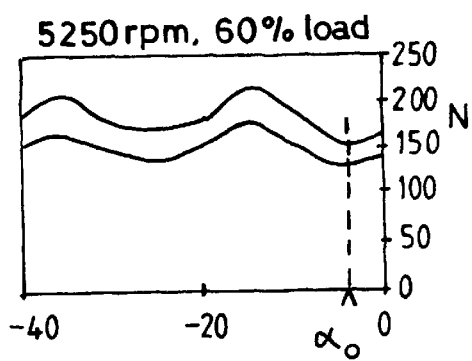
Figure 3H:
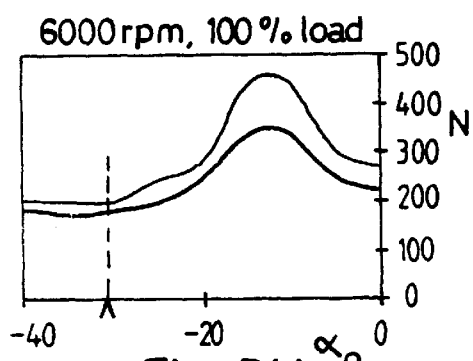
Figure 4H:
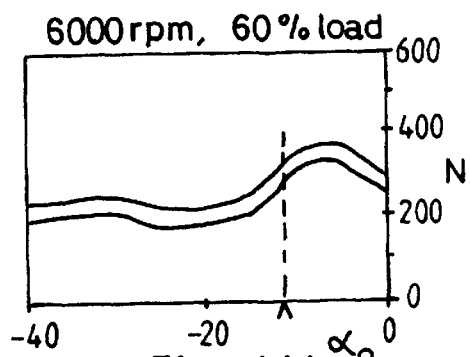

FIGS. 5 and 6 show how the background noise window may be moved in order to improve the accuracy of the background noise measurement. FIG. 5 shows a noise window N2 having $\alpha_0=0°$, which in the present example would be appropriate for an engine operating at 2000 rpm and 60% load, as shown by FIG. 4B. FIG. 6 shows a different noise window N3 having $\alpha_0=-37°$, which would here be appropriate for an engine operating at 4000 rpm and 100% load, as shown by FIG. 3D. For both FIGS. 5 and 6, a knocking noise window N1 extends from $\alpha=10°$ to $\alpha=60°$.

The stated first and second ranges of the present example, extending respectively over 10° and 50°, are not critical to the performance of the invention, and in particular the second range may be chosen to be less, for example 40°, depending on the knock characteristics of the engine.

The background noise windows N2,N3, therefore, define a selectable first range of engine angles that extends over about 10° of angle during which no knocking takes place (i.e., no combustion takes place or only the preliminary stages of combustion take place), and the knock noise window N1 defines a fixed second range extending over about 40° to 50° of crank angle during which combustion takes place from about 10° after a top dead center position for the engine.

Figure 7:
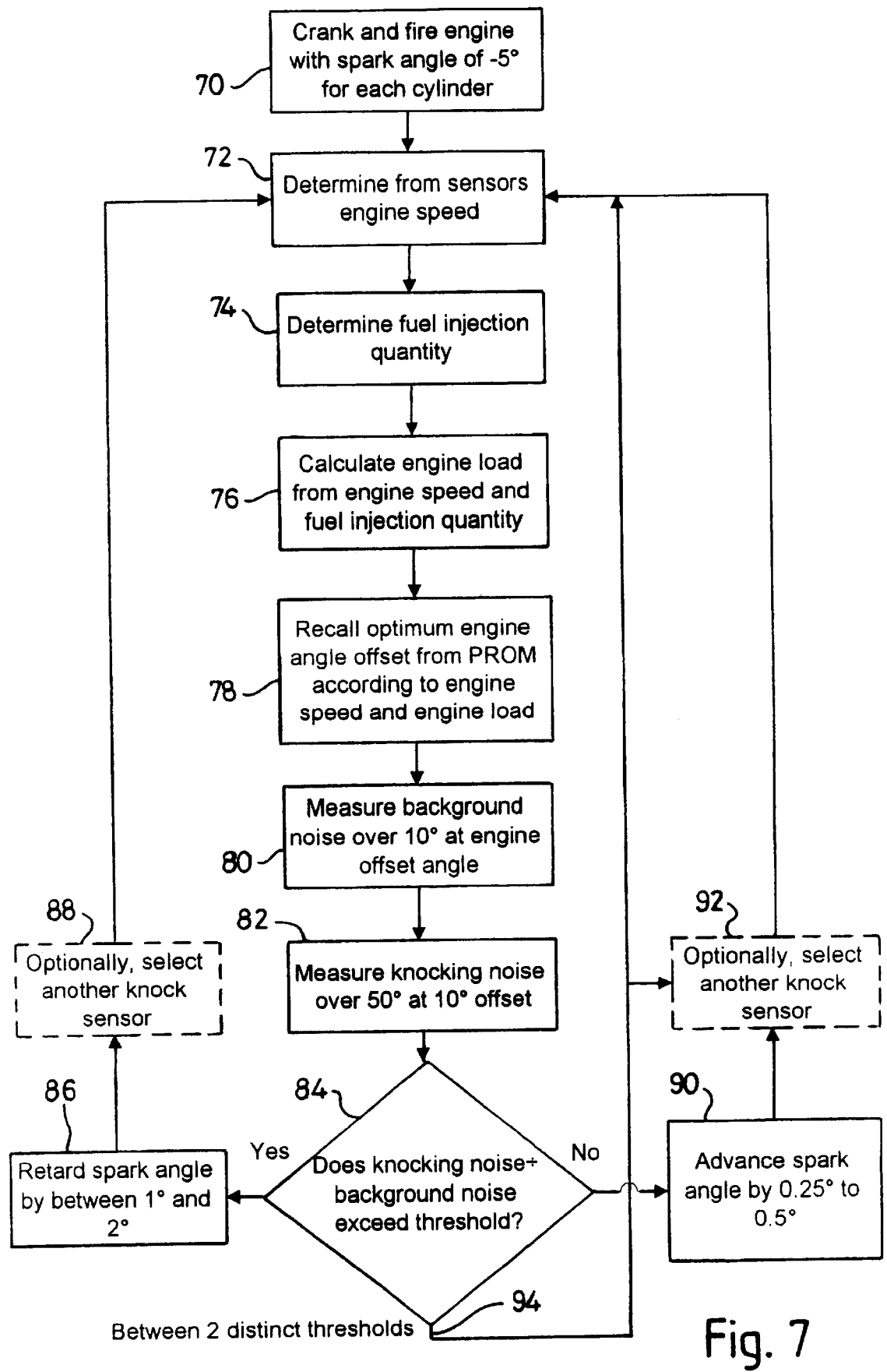
FIG. 7 is a flow diagram describing control of the engine by the engine management system.

FIG. 7 shows a flowchart that details how the engine management system performs the background and knock noise measurements in order to control the spark angle. When the engine is first started 70, the engine management system 10 fires the engine with a spark angle set at −5° for each cylinder. As the engine begins to turn, the microprocessor 12 then determines 72 from the digitized VRS signal 40 the engine speed, and then determines 74 a fuel injection quantity according to the engine speed and the driver demand signal 24. From the engine speed and injected fuel quantity, the microprocessor 12 can then calculate 76 the engine load.

During manufacture of the engine 1, the EPROM 17 is loaded with a lookup table holding data of numerous engine speed and engine load values together with predetermined engine angle offset values $α_0$ for which it has been determined that the variability in engine background noise will be least. The microprocessor 12, therefore, looks up 78 in the PROM 17 an engine offset value $α_0$ according to the measured engine speed and calculated engine load.

The microprocessor 12 can then measures or determine 80 from the digitized noise signal 41 a background noise level, for example, by combining the digitized noise value in a rolling average with previously determined values. The microprocessor 12 then performs a similar measurement to determine 82 an average engine knocking noise value. During these steps, the microprocessor 12 controls stages 21, 22 and 23 via control lines 27, 28 and 29, as described above.

The microprocessor 12 can then compare 84 the background and knocking noise values to determine if engine knocking is present. For example, if the background and knocking noise values have been appropriately scaled, the comparison may be a simple ratio. If the ratio exceeds a predetermined threshold value, then engine knocking will be known to have occurred. In this case 86, the microprocessor immediately retards the spark angle for one or more of the cylinders by a significant amount, for example, by between 1° and 2°. Software in the microprocessor then loops back to box 72 to perform again the sequence of steps described above.

Optionally, prior to looping back to box 72 in which engine speed is determined, the engine management system may select another knock sensor 88. In the case of a four-cylinder engine having two knock sensors 5,6, the microprocessor 12 may retard just the two cylinders nearest the particular knock sensor used in the knock detection.

If knocking is not detected, then the microprocessor advances 90 the spark angle by a small amount, for example by between 0.25° and 0.5°, for one or more cylinders, prior to looping back as described above to box 72.

Optionally, where more than one knock sensor 5,6 is used, the microprocessor 12 may first select another knock sensor. In the case of a four-cylinder engine having two knock sensors 5,6, the microprocessor 12 may advance just the two cylinders nearest the particular knock sensor used in the knock detection.

Optionally, the microprocessor may neither advance nor retard the spark angle if the comparison of the average background and average noise values falls between two distinct threshold values 94.

The invention as described herein may be adapted to suit the characteristics of a wide variety of engines. With some engines, the engine noise may vary more markedly with changes in engine or coolant temperature. In such a case, an input signal from a temperature sensor would be used by the processor means in the selection of the first range of engine angles. Since most internal combustion engines for present day motor vehicles have engine control units that receive input signals from engine speed and angle sensors, and have the capability to control spark timing, the invention may be implemented relatively inexpensively, for example, with the provision of an engine noise sensor and additional software in the engine control unit. The invention also permits the threshold level or levels to be predetermined, rather than calculated according to some algorithm or generated by additional electronic circuitry, thereby facilitating a relatively simple implementation in software.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A knock detection system for a spark ignition internal combustion engine having at least one cylinder with a spark plug, the system comprising:
    an engine condition sensing arrangement including an engine speed sensor, engine angle sensor and engine noise sensor; and
    an engine management system arranged to receive input signals from the engine condition sensors and to determine therefrom engine angle and engine noise, wherein the engine management system comprises a nonvolatile memory, a spark plug driver for generating an ignition spark, and a processor arranged to:
    a) control the spark driver to generate the ignition spark at a desired spark angle according to at least some of the input signals;
    b) determine over a first range (N2,N3) of engine angles a background engine noise, and determine over a second range (N1) of engine angles an engine knock noise;
    c) retard the spark angle if the level of knock noise relative to background noise exceeds a first level, and advance the spark angle if the level of knock noise to background noise falls below a second level, wherein the processor is further arranged to select the first range (N2,N3) of angles from a plurality of engine angle ranges stored in the nonvolatile memory based on a signal from the engine speed sensor.

2. A spark ignition internal combustion engine as claimed in claim 1, in which the first level is the same as the second level.

3. A spark ignition internal combustion engine as claimed in claim 2, in which the first and second levels are predetermined.

4. A spark ignition internal combustion engine as claimed in claim 1, wherein the processor is arranged to calculate from the input signals the engine load, wherein the first range (N2,N3) of angles is selected by the processor based on the engine load.

5. A spark ignition internal combustion engine as claimed in claim 1, wherein the first range (N2,N3) extends over about 10° of angle during which no knocking can take place, and the second range (N1) extends over about 40° to 50° of crank angle starting from about 10° after a top dead center position during which combustion takes place.

6. A method of running a spark ignition internal combustion engine having at least one cylinder with a spark plug, engine condition sensors including an engine speed sensor, engine angle sensor and engine noise sensor, an engine management system arranged to receive input signals from the engine condition sensors and to determine therefrom engine angle and engine noise, the engine management system comprising a nonvolatile memory, a spark plug driver for generating an ignition spark, the method comprising:
    a) controlling the spark driver to generate the ignition spark at a desired spark angle according to at least some of the input signals;
    b) determining over a first range (N2,N3) of engine angles a background engine noise, and determining over a second range (N1) of engine angles an engine knock noise;

c) retarding the spark angle if the level of knock noise relative to background noise exceeds a first level, and advancing the spark angle if the level of knock noise to background noise falls below a second level, wherein step b) further comprises:

d) selecting the first range (N2,N3) of angles from a plurality of engine angle ranges stored in the nonvolatile memory based on a signal from the engine speed sensor.

7. A method of running a spark ignition internal combustion engine as claimed in claim 6, further comprising:

e) measuring the background engine noise over various first ranges (N2,N3) for various engine operating conditions including different engine speeds;

f) identifying a particular first range (N2,N3) for each of the various engine operating conditions at which the variance in engine background noise for the engine is reduced; and g) storing data representative of the particular first ranges in the nonvolatile memory along with data representative of the corresponding engine operating conditions.

\* \* \* \* \*